(12) United States Patent
Canright et al.

(10) Patent No.: US 7,752,198 B2
(45) Date of Patent: Jul. 6, 2010

(54) METHOD AND DEVICE FOR EFFICIENTLY RANKING DOCUMENTS IN A SIMILARITY GRAPH

(75) Inventors: Geoffrey Canright, Olso (NO); Kenth Engo-Monsen, Fredrikstad (NO)

(73) Assignee: Telenor ASA, Fornebu (NO)

( * ) Notice: Subject to any disclaimer, the term of this patent is extended or adjusted under 35 U.S.C. 154(b) by 279 days.

(21) Appl. No.: 11/739,492

(22) Filed: Apr. 24, 2007

(65) Prior Publication Data

US 2007/0250502 A1 Oct. 25, 2007

Related U.S. Application Data

(60) Provisional application No. 60/794,118, filed on Apr. 24, 2006.

(51) Int. Cl.
*G06F 17/30* (2006.01)
(52) U.S. Cl. .................. 707/723; 707/726; 707/735; 707/748; 707/798
(58) Field of Classification Search .............. 707/3–5, 707/102, 104.1; 715/234
See application file for complete search history.

(56) References Cited

U.S. PATENT DOCUMENTS

| | | | | |
|---|---|---|---|---|
| 5,832,494 | A * | 11/1998 | Egger et al. | 707/102 |
| 6,038,574 | A | 3/2000 | Pitkow et al. | |
| 6,622,139 | B1 | 9/2003 | Nakayama et al. | |
| 6,629,097 | B1 * | 9/2003 | Keith | 707/5 |
| 6,847,966 | B1 * | 1/2005 | Sommer et al. | 707/5 |
| 6,990,628 | B1 * | 1/2006 | Palmer et al. | 715/234 |
| 6,996,572 | B1 * | 2/2006 | Chakrabarti et al. | 707/102 |
| 7,185,001 | B1 * | 2/2007 | Burdick et al. | 707/3 |
| 7,188,106 | B2 * | 3/2007 | Dwork et al. | 707/5 |
| 2006/0059144 | A1 * | 3/2006 | Canright et al. | 707/5 |
| 2006/0095416 | A1 * | 5/2006 | Barkhin et al. | 707/3 |
| 2006/0155751 | A1 * | 7/2006 | Geshwind et al. | 707/102 |
| 2007/0185871 | A1 * | 8/2007 | Canright et al. | 707/7 |
| 2007/0203908 | A1 * | 8/2007 | Wang et al. | 707/7 |

FOREIGN PATENT DOCUMENTS

WO WO 2005/043284 A2 5/2005
WO WO 2006/033763 A2 3/2006

OTHER PUBLICATIONS

Paricha Ingongngam, et al., "Topic-Centric algorithm: A novel approach to web link analysis", Proceedings of the 18th International Conference on Advanced Information Networking and Application (AINA'04), vol. 2, XP-010695244, Mar. 29, 2004, pp. 299-301.
Ricardo Baeza-Yates, et al., "Relating Web Characteristics with Link Based Web Page Ranking", String Processing and Information Retrieval (SPIRE'01), XP-010583172, Nov. 13, 2001, pp. 21-32.
Zheng Chen, et al., "A Unified Framework for Web Link Analysis", Proeceedings of the 3rd International Conference on Web Information Systems Engineering (WISE'02), XP-010632781, Dec. 12, 2002, pp. 63-70.

* cited by examiner

*Primary Examiner*—Don Wong
*Assistant Examiner*—Hanh B Thai
(74) *Attorney, Agent, or Firm*—Oblon, Spivak, McClelland, Maier & Neustadt, L.L.P.

(57) ABSTRACT

A method, device and computer program product for determining an importance score for a document D in a document set by exploiting a similarity matrix/graph S or subgraph S'.

12 Claims, 10 Drawing Sheets

METHOD AND DEVICE FOR EFFICIENTLY RANKING DOCUMENTS IN A SIMILARITY GRAPH

CROSS REFERENCE TO RELATED APPLICATIONS

The present invention contains subject matter related to co-pending application Ser. No. 10/687,602 filed on Oct. 20, 2003; co-pending Application Ser. No. 10/918,713 filed on Aug. 16, 2004; co-pending application Ser. No. 11/227,495 filed on Sep. 16, 2005, and co-pending application Ser. No. 11/349,235 filed on Feb. 8, 2006. This application also claims priority to U.S. Provisional Application Ser. No. 60/794,118 filed on Apr. 24, 2006. The contents of each being incorporated herein by reference.

BACKGROUND OF THE INVENTION

1. Field of Use

The present invention is a novel method and device for evaluating the relevance of an electronic document, as compared to other electronic documents in an electronic document set. Relevance may be defined with reference to a search (e.g., a set of keywords); alternatively, relevance may be defined independently of a search, but refers to a measure of the document's relevance with respect to the entire document set (in which case relevance may be termed 'importance').

2. Description of the Background

In the field of electronic document and text searching, a challenge exists to find ways for a machine to evaluate relevance of documents or other information objects (the term 'document' being construed to mean any kind of information object in a searchable set). Most methods fall into one of two categories: text relevance analysis (TRA), and link analysis (LA).

Text relevance analysis involves electronically analyzing the content of a given document D, and using computer-based methods to determine the document's relevance (typically, with respect to keywords in an electronic search).

In contrast, link analysis electronically analyzes the context in which a document lies (rather than its content). More specifically, this context is defined in terms of links between documents. Link analysis methods exploit information about the structure of the set of links between documents, in order to obtain a measure of the importance (i.e., relevance) of each document. The word centrality is illustrative here: Link analysis seeks to measure the "centrality" of each document, as seen in the context of all the relations (links) between documents.

The present invention is an improvement on at least one known method for link analysis. The famous PAGERANK algorithm of GOOGLE is an outstanding example of a link analysis approach. PAGERANK is search-independent—that is, the importance of a Web page is evaluated by the PAGERANK algorithm using only information on the set of links in the Web graph. Thus, a page's PAGERANK score does not depend on the search being performed.

A PAGERANK score is obtained by finding the principal eigenvector of a large matrix, where information about the hyperlinks in the Web graph is stored in this matrix. Computing the PAGERANK scores of all documents in a hyperlinked graph can be very time consuming (and also memory intensive) if the number of documents is large. One operation that is very time consuming is the multiplication of the matrix by a vector. This operation (matrix×vector) must be used repeatedly for finding the principal eigenvector of the matrix. For sparse matrices (which is typically the case for reasonable document sets), the time to multiply (matrix×vector) scales roughly linearly with the number of documents (N). Hence, for large document sets, the desire for computational efficiency drives interest in finding ways to reduce the number of (matrix×vector) operations that are needed (hereinafter, the number of iterations).

An alternate method to PAGERANK and related approaches for link analysis is termed 'link popularity'. With link popularity, the importance of a document D (in a hyperlinked set) is considered to be proportional to the number of documents which link into the document D. The idea here is that a link pointing to D is a type of recommendation of D by the author of the document P which points to D. Hence, a computing device can estimate the importance or (search-independent) relevance of D by simply counting the number of recommendations (in-links) that D has.

An advantage of link popularity is that link popularity can be determined quickly. In fact, computing link popularity for an entire document set can be easily shown to be equivalent (in terms of time needed) to a single iteration of a simple matrix operation (matrix×vector). Thus, if the document set is large, finding link popularity scores may be performed much more quickly than finding the PAGERANK scores.

Link popularity has, however, an important weakness—link popularity gives each recommendation the same weight. That is, no consideration is given to the quality of the page P which is making the recommendation (i.e., pointing to D). This is contrary to typical human experience: normally a person wants to know the quality of the recommender before deciding how much weight to give to the recommendation.

Also, one can 'spam' the link popularity approach by laying in a set of worthless 'dummy' pages whose only function is to point to a document D and to thus increase the document's importance rating. The possibility of spamming link popularity scores is well known. A common fix for this problem is to make the weight given to a recommendation proportional to the importance of the recommending document. This eliminates the simple from of spamming described above. However, the mathematical result of implementing this requirement is that one must find the principal eigenvector of the link topology matrix. Thus, one comes back to a need for many (matrix×vector) iterations rather than just one (matrix×vector) iteration.

The inventors of the present invention have (in earlier co-pending applications Ser. Nos. 10/687,602, 10/918,713, 11/227,495, and 11/349,235) exploited a type of link analysis different from PAGERANK type methodologies. These prior inventions involve using hyperlinks and various aspects of link analysis and document importance scores, including: methods for analyzing hyperlinked document sets; methods for link-poor domains, where one builds and exploits a similarity graph; and also methods for a hybrid case, in which a computing device exploits both existing hyperlinks and similarity links. The methods of co-pending applications Ser. Nos. 10/687,602, 10/918,713, 11/227,495, and 11/349,235 for hyperlink analysis have been shown in tests to be at least as good at giving relevance scores as is the PAGERANK method of GOOGLE. Furthermore, the methods using similarity links provide useful relevance scores for documents in link-poor domains.

One technique used in the approaches of co-pending applications Ser. Nos. 11/227,495 and 11/349,235 is to build links between documents in document sets which do not have pre-existing links (e.g., do not have the pre-existing hyperlinks of the World Wide Web, which have been laid down by millions of Web page authors). This technique of co-pending applications Ser. Nos. 11/227,495 and 11/349,235 is predicated on the idea that one cannot ask a computing device to build one-way recommendations from one document to another, but that one can get a computing device to give a reasonable measure of how related (similar) two documents are. Hence, in the approaches of co-pending applications Ser. Nos. 11/227,495 and 11/349,235, a similarity link may be established between documents D and E by a machine-implementable algorithm. This similarity link has two properties which distinguish the similarity link from a typical hyperlink: (i) the similarity link of co-pending applications Ser. Nos. 11/227,495 and 11/349,235 is (typically) symmetric—the similarity link 'points both ways'; and (ii) the similarity link of co-pending applications Ser. Nos. 11/227,495 and 11/349,235 may have a weight which is equal to the similarity score s(D,E) which is calculated for a document pair (D,E). Thus, the similarity link of co-pending applications Ser. Nos. 11/227,495 and 11/349,235 may be viewed as a kind of 'two-way recommendation' between D and E: if one is interested in D, and s(D,E) is large, then one is likely also to be interested in E (and vice versa).

In the technique of co-pending applications Ser. Nos. 11/227,495 and 11/349,235, the set of similarity links forms a graph, which is called the similarity graph; and the weights may be stored in an N×N matrix termed the similarity matrix S. In co-pending applications Ser. Nos. 11/227,495 and 11/349,235, methods for link analysis which exploit the similarity matrix S are described. In particular, application Ser. No. 11/349,235 describes methods which involve finding the principal eigenvector of the entire similarity matrix S, and using this vector to give importance scores for documents. In contrast, each of application Ser. No. 11/227,495 and application Ser. No. 11/349,235 discloses finding the principal eigenvector for a subgraph S' of the similarity matrix, and using this vector to give importance scores for documents.

The scores obtained from the principal eigenvector of a graph with weighted, symmetric links (such as the similarity graph S or a subgraph S' of the similarity graph) are often called eigenvector centrality scores (abbreviated EVC). This term (eigenvector centrality or EVC) will also be used here to denote the scores obtained from the principal eigenvector of the similarity matrix (whole or sub). The term is illuminating, since the scores do measure a type of graph centrality—and they are obtained from an eigenvector.

In addition to employing similarity links, both application Ser. No. 11/227,495 and application Ser. No. 11/349,235 discuss combining information about the hyperlink structure (where hyperlinks exist) with information about the similarity links, giving a 'hybrid' method (i.e., one using both hyperlinks and similarity links). In each case, the structure of the network of similarity links is exploited to estimate (by assigning scores) the importance of documents.

When the entire similarity matrix is used (as described in application Ser. No. 11/227,495 or as in application Ser. No. 11/349,235), the resulting importance scores are search-independent. Using the entire similarity matrix tends to give the greatest importance to documents which are 'central' in terms of the whole graph—regardless of the topic of the search. Such documents tend to be rather 'generic'; but they may be useful for some purposes. On the other hand, application Ser. No. 11/227,495 and application Ser. No. 11/349,235 also define a subgraph of the similarity graph, obtained from a hit list of a search. Thus, this subgraph is topic-focused. A document which is most central in this subgraph is thus a document which may be regarded as 'central' with respect to the search topic—but not necessarily with respect to other search topics. In short: importance scores from a subgraph, as determined by the methods described in application Ser. No. 11/227,495 and in application Ser. No. 11/349,235, are search-dependent.

Depending on circumstances, it is often desirable to use the similarity subgraph technique of application Ser. No. 11/227,495 or application Ser. No. 11/349,235, so that importance scores are evaluated relative to the topic of the search.

However, the subgraph methods of application Ser. No. 11/227,495 and of application Ser. No. 11/349,235 have a disadvantage when compared to the whole-graph methods of these same Applications. In the subgraph methods of application Ser. No. 11/227,495 and application Ser. No. 11/349,235, it is very difficult to compute ahead of time (and offline) the importance scores with regard to every possible subgraph which might be generated for every possible search topic. That is, these subgraph-based scores must be computed in real time, after a search request is presented to a search system. However, if the hit list is large, the computation of the topic-focused relevance scores from the hit-list subgraph may become very time consuming for real time applications.

In contrast to the topic-focused subgraph methods of application Ser. No. 11/227,495 and application Ser. No. 11/349,235, scores for the whole-graph methods of these same Applications need only be computed once—as they are search-independent. These whole-graph scores may thus computed offline, and then updated (also possibly offline) whenever the document set is deemed to have changed significantly. However, the size of the matrix for these whole-graph methods is always equal to the number N of documents. Hence the whole-graph methods can be computationally complex if N is very large.

Methods for scoring documents which rely on hyperlinks—such as the conventional PAGERANK and link popularity methods (and other conventional approaches using hyperlinks)—have, in addition to the previously identified shortcomings, one further fundamental limitation: these methods cannot be used unless the hyperlinks have already been laid down. That is, conventional PAGERANK and link popularity methods cannot be used in so-called 'link-poor domains.'

PAGERANK and other conventional approaches directed to finding the principal eigenvector of a matrix which represents the entire document set also have the disadvantage that the required calculation is very time consuming when the document set is very large. Link popularity lacks this problem (having a time requirement equivalent to one iteration). But, as noted above, link popularity tends to give poorer results, and is subject to spamming.

As noted above, the whole-graph methods of application Ser. No. 11/227,495 and application Ser. No. 11/349,235 may be calculated offline. However these whole-graph methods have the disadvantage—in common with PAGERANK—that the matrix used can be very large if the document set is large, so that each iteration can be very time consuming.

The subgraph methods of application Ser. No. 11/227,495 and application Ser. No. 11/349,235 use a smaller matrix in general than does any whole-graph method. However, the importance scores from any subgraph method must be calculated in real time. The need for real time calculations can, in some cases, offset the advantage of the subgraph methods over the whole-graph methods of application Ser. No. 11/227,495 and of application Ser. No. 11/349,235 that accrues due to the smaller matrix involved when only a subgraph is used. For example, if the document set is large and the search is not tightly focused, then the hit list of the methods of application Ser. No. 11/227,495 and application Ser. No. 11/349,235 which defines the topic-focused subgraph may have millions of hits. In such cases, it is not desirable to perform—in real time, while the user waits—the many iterations required to obtain importance scores from finding the principal eigenvector of the subgraph, because the subgraph itself may be too large.

Thus, the present inventors have conceived of a new approach which addresses the deficiencies noted above relative to conventional link analysis and link popularity approaches, and that improves upon the methods of co-pending applications 10/687,602, 10/918,713, 11/227,495, and 11/349,235.

SUMMARY OF THE INVENTION

The present invention is directed to a method, device and computer program product for determining an importance score for a document D in a document set. The method operates by exploiting a similarity matrix/graph S. The method may be used on either the entire graph S or on a subgraph S'. The method has as its starting point a similarity graph or subgraph, which is similar to the similarity graph used in application Ser. No. 11/227,495 or application Ser. No. 11/349,235. In contrast to the approaches used in these earlier applications, the present invention obtains an importance score for a document D by summing the link strengths of all similarity links connected to D.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
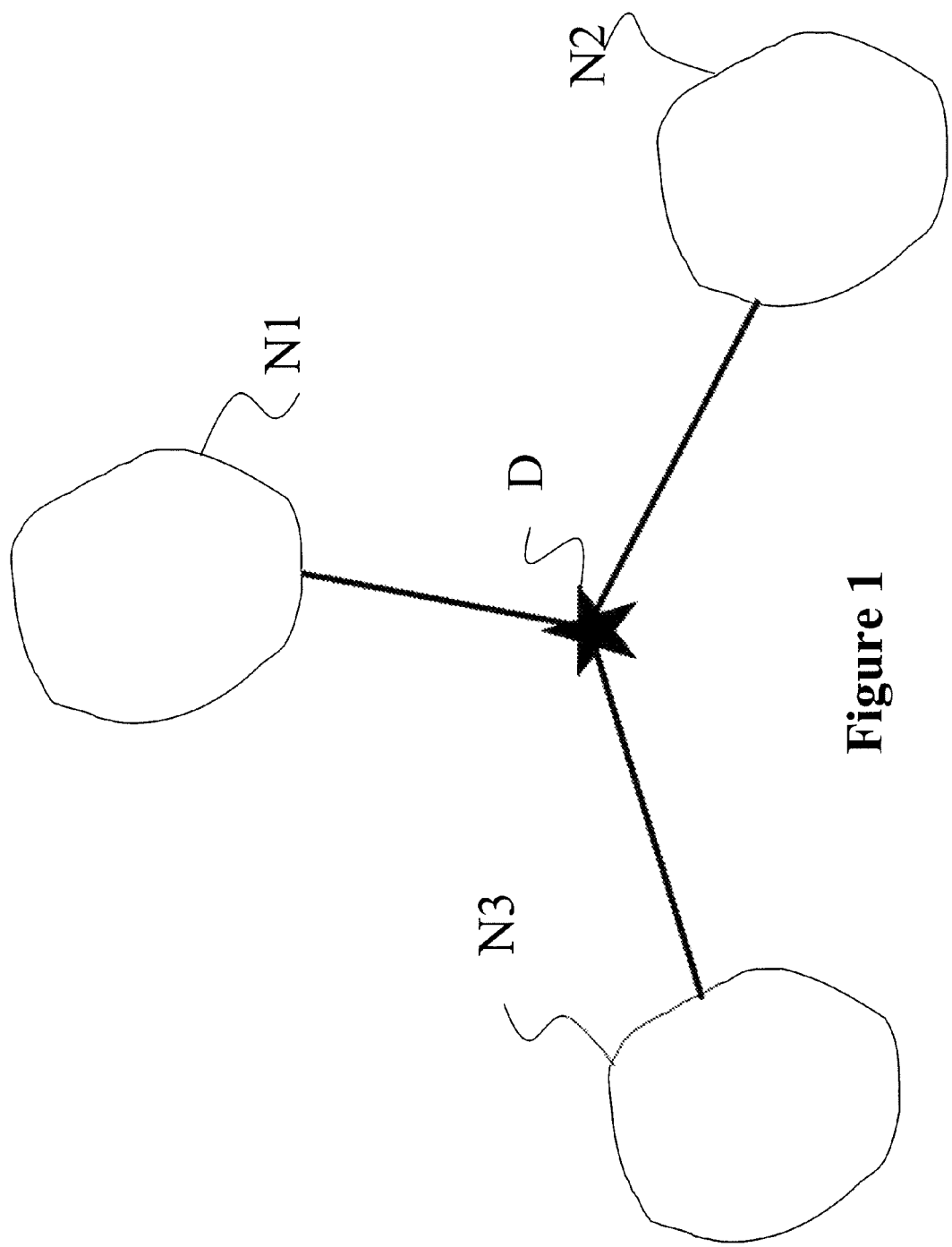
FIG. 1 shows an illustrative graph in which the starred node may have high eigenvector centrality (EVC), but a low link popularity score (LPS)

The present invention is directed to a method, device and computer program product for determining an importance score for a document D in a document set. The method operates by exploiting a similarity matrix/graph S. The method may be used on either the entire graph S or on a subgraph S'. The method has as its starting point the same similarity graph or subgraph as that used in application Ser. No. 11/227,495 or application Ser. No. 11/349,235. In contrast to the approaches used in these earlier applications, the present invention obtains an importance score for a document D by summing the link strengths of all similarity links connected to D.

The present invention is based on a form of link popularity, but applied to a similarity graph rather than to a hyperlink graph. Through extensive experimentation, the inventors have discovered that link popularity analysis, when applied to a weighted similarity graph, is much more likely to give good results than the conventional technique of applying link popularity methods to an unweighted hyperlink graph.

This result is counterintuitive and therefore surprising. Years of experience with hyperlink-based link analysis have shown that link popularity is often a poor measure of the importance of a document, and that eigenvector-based methods give better results, while at the same time providing resistance to hyperlink spam. Thus it is natural to expect that eigenvector-based methods should also give the best results when applied to weighted similarity graphs. The present invention thus goes against this natural expectation. However—as will be seen below—both careful logical reasoning and test results indicate that, in fact, link popularity can offer significant advantages over eigenvector-based methods, when used with weighted similarity graphs.

Link popularity has the clear advantage over other methods in that link popularity requires less computing time than the eigenvector calculation which is used in the PAGERANK method, and in the methods of application Ser. No. 11/227,495 and application Ser. No. 11/349,235. In particular, link popularity analysis provides a solution to a time bottleneck problem that can occur for the real-time approaches of application Ser. No. 11/227,495 and application Ser. No. 11/349,235. Link popularity analysis is also advantageous to speed up the offline work involved in application Ser. No. 11/227,495 and application Ser. No. 11/349,235. Hence, the present invention offers a significant speedup for each of these methods (real-time subgraph, or offline whole-graph). Either the method of application Ser. No. 11/227,495 or application Ser. No. 11/349,235 (or any other existing method seeking to determine a principal eigenvector) may require dozens or even hundreds of iterations (depending on the convergence criteria chosen for these iterative methods). Link popularity, as noted above, has a time requirement which is equivalent to a single iteration of the eigenvector methods. Hence the speedup factor of the present invention can be roughly equal to the number of iterations required for the eigenvector methods—so that, in some (plausible) cases, the new method uses just a fraction of 1% of the time used by the eigenvector method of application Ser. No. 11/227,495 or application Ser. No. 11/349,235.

The speedup of the present invention may be achieved with little or no reduction in quality of the results. This maintenance of quality is in strong contrast with the conventional application of link popularity to an unweighted hyperlink graph, such as the Web graph. In the conventional case, one skilled in the art expects a significant and tangible, and perhaps severe, loss of quality of the scoring values, due to the fact that link popularity ignores the quality of the recommending documents in a hyperlinked graph.

In contrast, the special nature of a weighted similarity graph used in the present invention gives rise to correlations among the links. These correlations, in turn, tend to ensure that the eigenvector centrality of a document is strongly correlated with the 'link popularity' determined using the method of the present invention. Hence, in terms of giving good importance scores, link popularity as applied to a similarity graph is about as good as eigenvector centrality obtained from the same graph. At the same time, link popularity can be many times faster. Thus, the advantages of the new method are clear.

A description of an implementation of the method of the present invention follows. The 'link popularity' analysis of the present invention—as with the method of application Ser. No. 11/227,495 or application Ser. No. 11/349,235—is based on a measure of the similarity s(D,E) for any given pair of documents D and E in the document set. Given this—which amounts to defining the similarity graph S—one can implement the whole-graph version of the present method. Furthermore, given a procedure for choosing a topic-focused subgraph S' of the whole graph S, one can implement the subgraph version by applying the new method to the subgraph S'. Implementation is based on taking a single sum for each document—in contrast to the conventional eigenvector methods, which require iterative matrix×vector multiplication, plus convergence tests, to obtain the principal eigenvector of the given matrix.

The present invention provides a new method for automatically evaluating the relevance/importance of document in a set of documents. The need for such evaluation arises naturally in the context of a search for information. The search is directed towards the document set. The result of the search, which is delivered by the search service, is (typically) a list of documents which are expected to have some information similar to what is being searched for. This list is called the "hit list" and the documents found are "hits".

It is very common for the hit list to have more hits than a typical human user is willing or able to look at. Hence, one may filter the hit list, so that the "best" hits are presented first to the user. The most common method for filtering is to rank the hits according to their relevance/importance, and then to display the ranked hit list with the "best" hits first.

Thus it is clear that, in the context of information search, it can be very important to be able to automatically evaluate the importance of a document. As discussed above, the two main types of method for doing this are text relevance analysis and link analysis. Text relevance analysis looks only at the content of each document, and attempts to assess its relevance to the presented search. In contrast, link analysis looks at how each document lies in a context which is defined by its relations (links) to the other documents.

Application Ser. No. 11/227,495 and application Ser. No. 11/349,235 have proposed building the similarity graph S as a novel method for placing each document in context, and so enabling link analysis for document sets which are otherwise poorly interlinked. In these earlier applications, link analysis is performed by finding the principal eigenvector of the similarity matrix, or of a hybrid matrix which is generated by combining the similarity matrix S with the matrix H of hyperlinks. This eigenvector is a list of positive real numbers, which may be used as a list of importance scores, one for each document.

The present method assumes that the similarity matrix has been obtained and is available in a suitable database. Then, instead of obtaining an eigenvector for the similarity matrix, the present method expedites processing by summing the link strengths, for each document, in order to obtain the relevance or importance score for that document.

Specifically: let r(D) be the relevance score for document D, and suppose that this relevance of D is to be evaluated with respect to the full similarity graph S (and hence in a search-independent fashion). The present method then determines r(D) (relative to the whole similarity graph) as follows:

$$r(D) = \sum_{\substack{E \in S \\ E \neq D}} s(D, E). \tag{1}$$

Any procedure may be used for calculating s(D,E).

Figure 3:
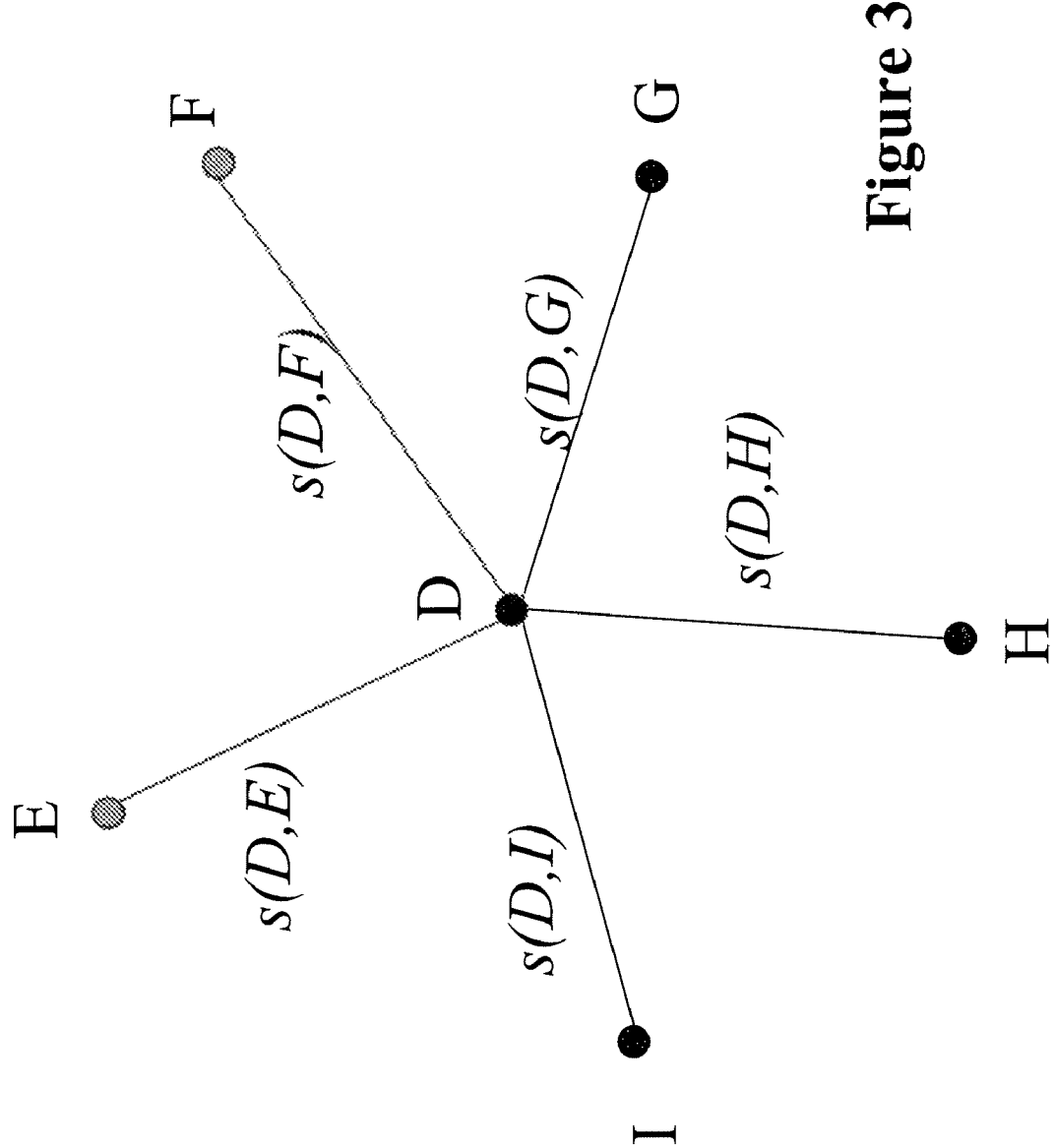
FIG. 3 shows a node D and its neighbors in a similarity graph, with the link strengths.
Figure 7:
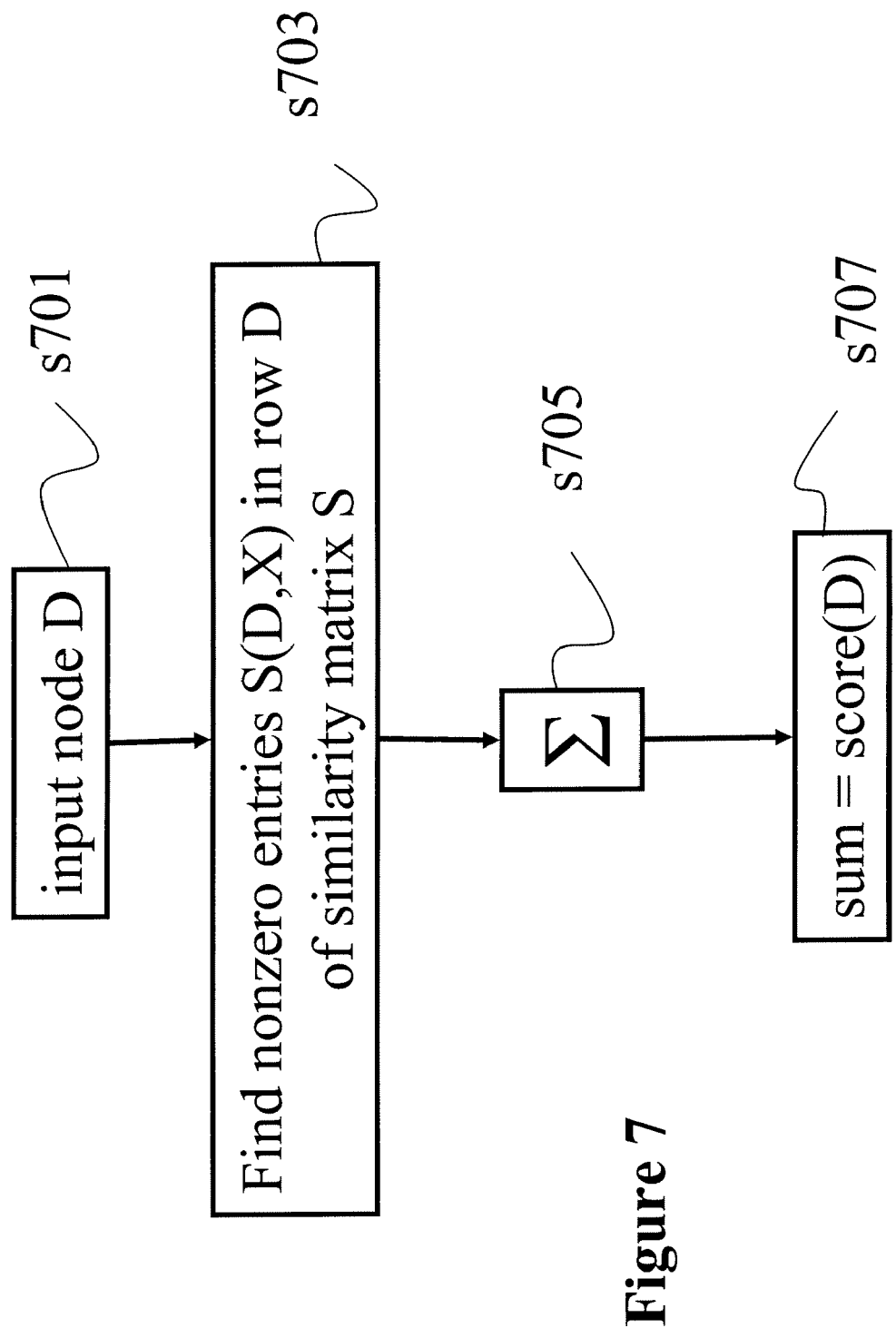
FIG. 7 shows a flow chart corresponding to one embodiment of the invention in which the whole similarity graph is used for scoring documents, and hyperlinks are not used.

FIG. 3 shows a node D and all of its neighbors (nodes E-I) with nonzero similarity links in the whole similarity graph, along with the link strengths. FIG. 7 then shows the procedure for determining the importance score for node D in this case (without hyperlinks).

In FIG. 7, the process starts with inputting a node D (S701). Nonzero entries S(D,X) in row D of a corresponding similarity matrix S are then found (S703). The nonzero entries are summed (S705), and a score is output (S707).

Similarly, if a search-dependent subgraph S' is to be used, the present method assigns r(D) as follows:

$$r(D) = \sum_{\substack{E \in S' \\ E \neq D}} s(D, E). \tag{2}$$

Figure 4:
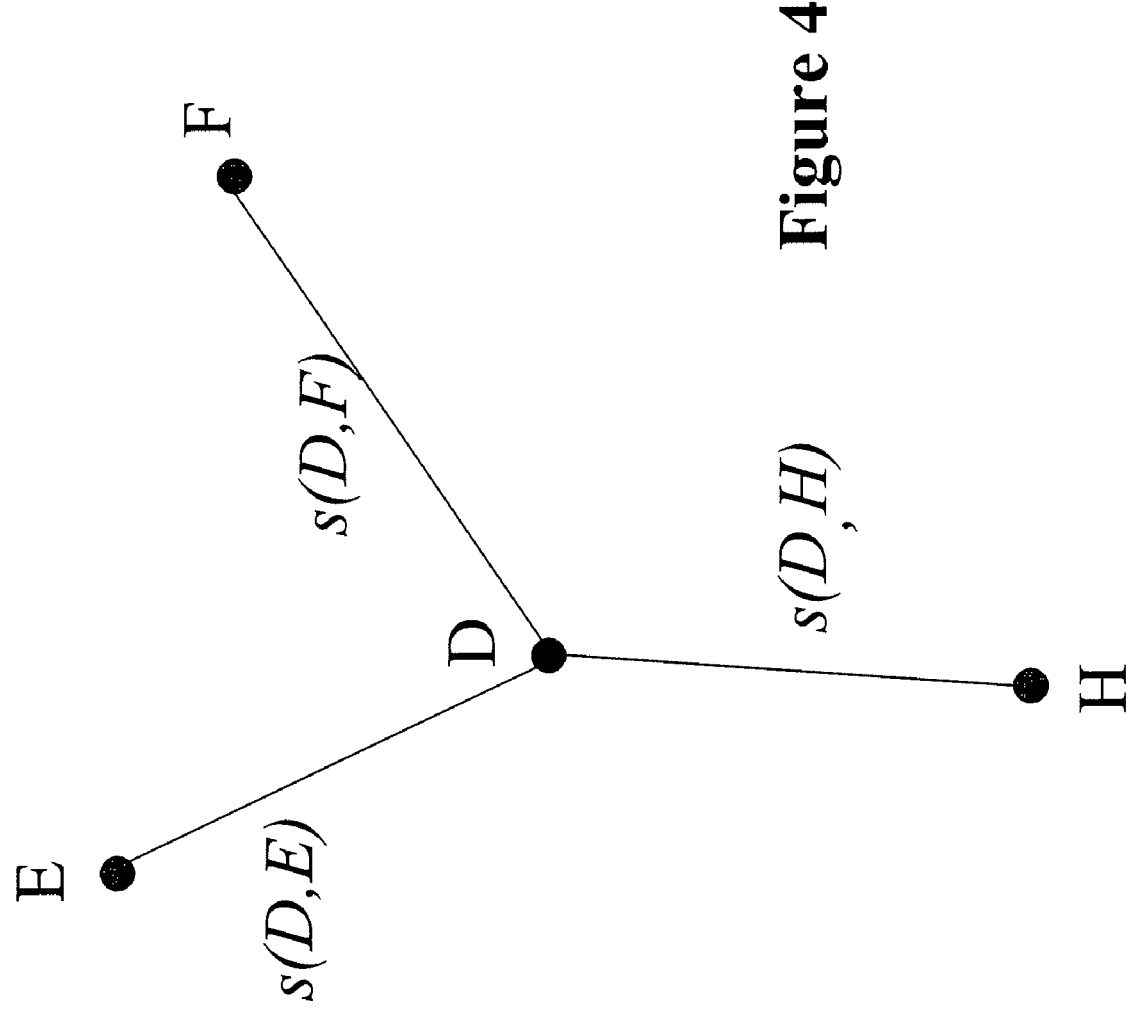
FIG. 4 shows a node D and its neighbors in a subgraph of the similarity graph, with the link strengths, where only the neighbors E, F, and H lie in the subgraph.
Figure 8:
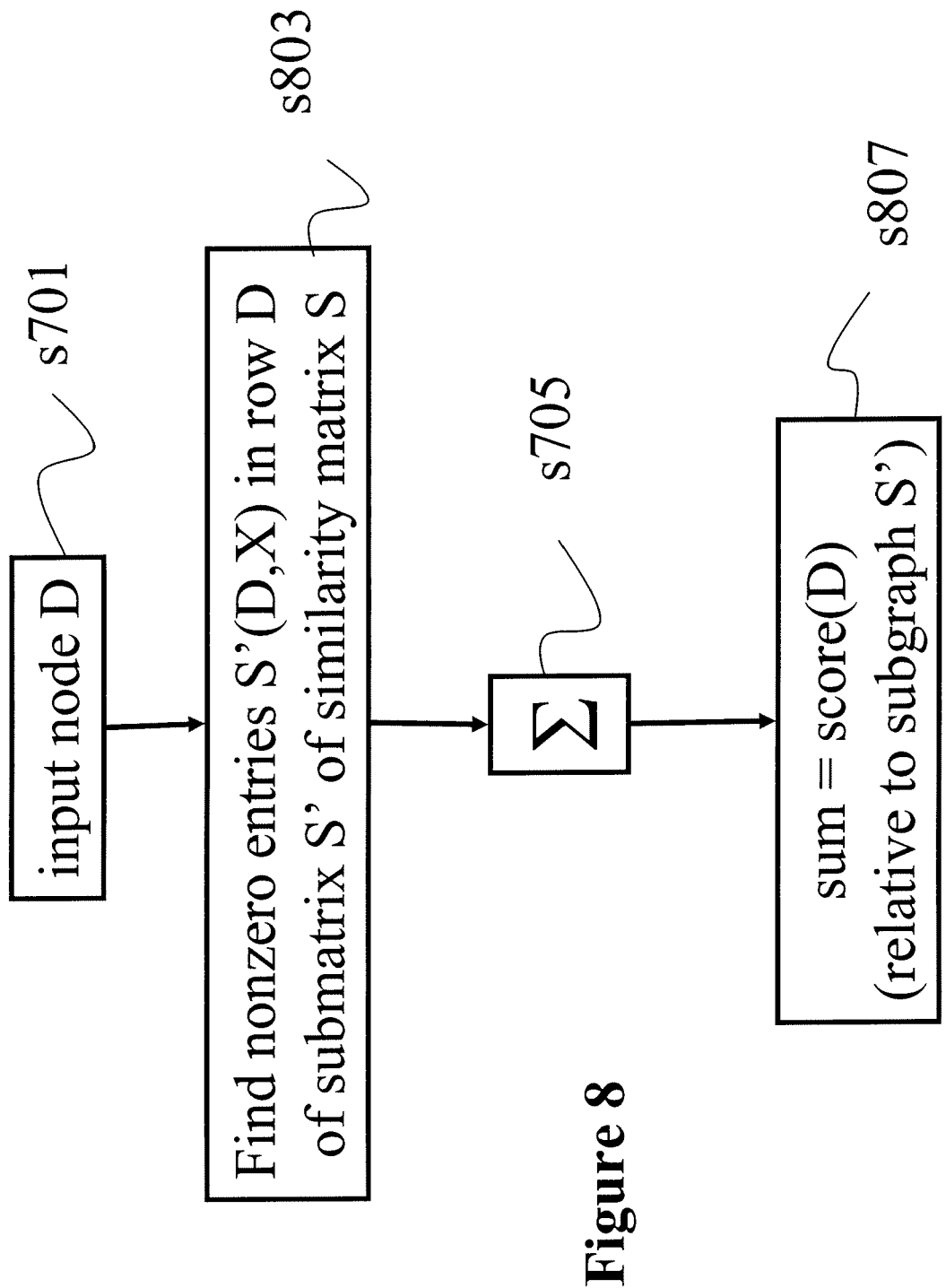
FIG. 8 shows a flow chart corresponding to another embodiment of the invention in which a subgraph of the similarity graph is used for scoring documents, and hyperlinks are not used.

FIG. 4 shows a node D and those of its neighbors (nodes E, F and H) which are found in the subgraph S'. FIG. 8 then shows the procedure for determining the importance score for node D in this subgraph case (again without hyperlinks).

In FIG. 8, the process starts with inputting a node D (S701). Nonzero entries S' (D,X) in row D of a submatrix S' of a corresponding similarity matrix S are then found (S803). The nonzero entries are summed (S705), and a score relative to the submatrix S' is output (S807).

Now suppose that there are also hyperlinks between documents in the document set, and that information on these hyperlinks is also available in a suitable database. These hyperlinks are then treated in the present method as recommendations, and the information which is present in these recommendations (hyperlinks) may be used, along with the information in the similarity links, in obtaining in the relevance scores for each document. Application Ser. No. 11/227,495 and application Ser. No. 11/349,235 describe eigenvector-based methods for using both kinds of information (hyperlinks and similarity links). In the present method this is done as follows.

First consider the whole-graph case—that is, that each document is to be evaluated in the context of all other documents. The number of inlinks $n_I(D)$ to document D is then determined, as follows:

$$n_I(D) = \sum_{\substack{E \in S \\ E \to D}} . \tag{3}$$

Here "E→D" means that E points to D with a hyperlink. The total relevance score for document D is then:

$$r(D) = \sum_{\substack{E \in S \\ E \neq D}} s(D, E) + c \cdot n_I(D). \quad (4)$$

Here c is a tuning parameter which may be adjusted to give best performance. In performance tests (see below), various values for c have been considered: c=0 (ignoring hyperlinks), c=0.5, and c=1. These tests have shown that including hyperlink information improves the results, but that the performance observed is not very sensitive to the value of c.

Figure 5:
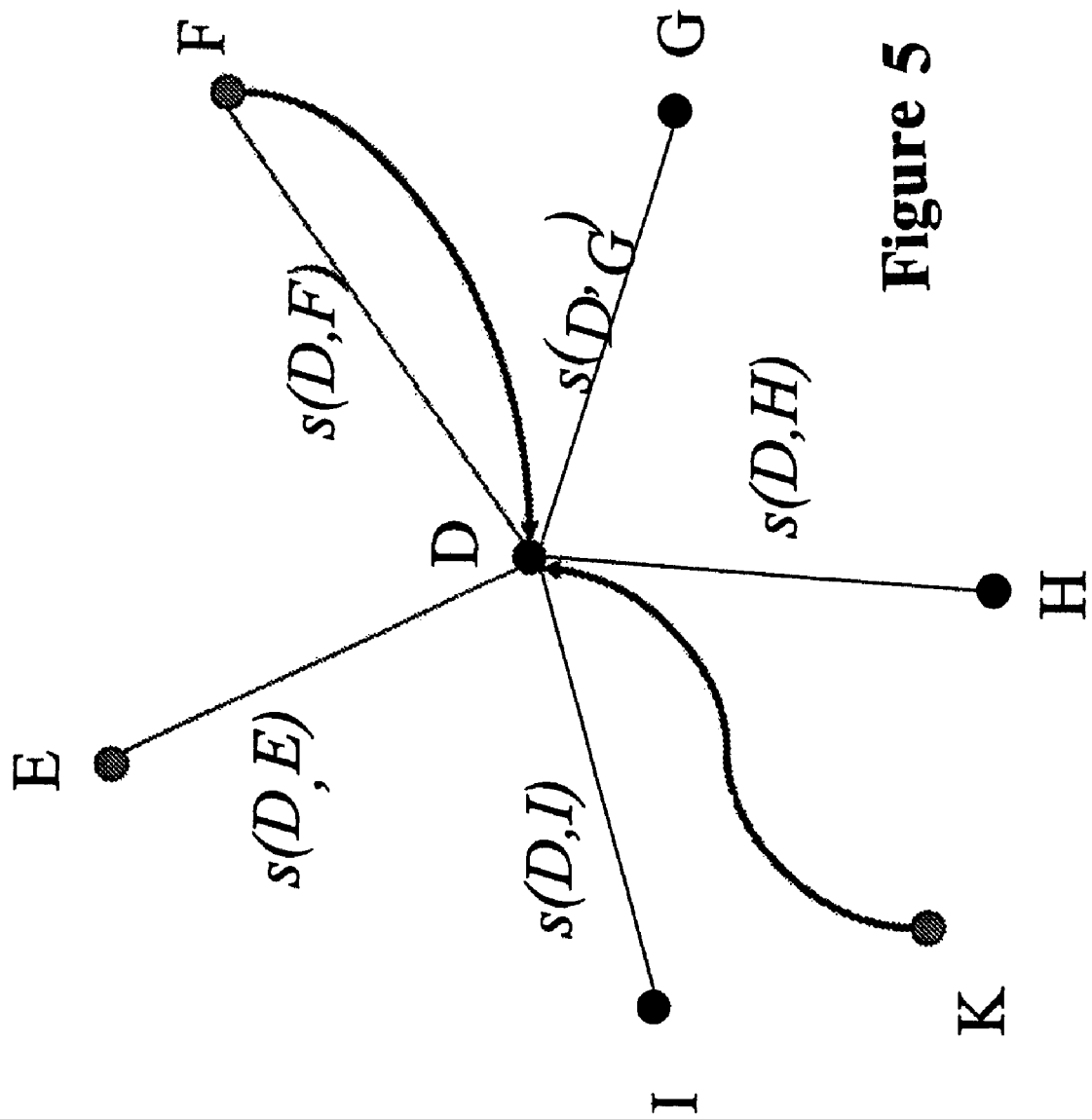
FIG. 5 shows a node D and its neighbors in a similarity graph, with the link strengths, where hyperlinks are also present, and those nodes pointing to D are shown.
Figure 9:
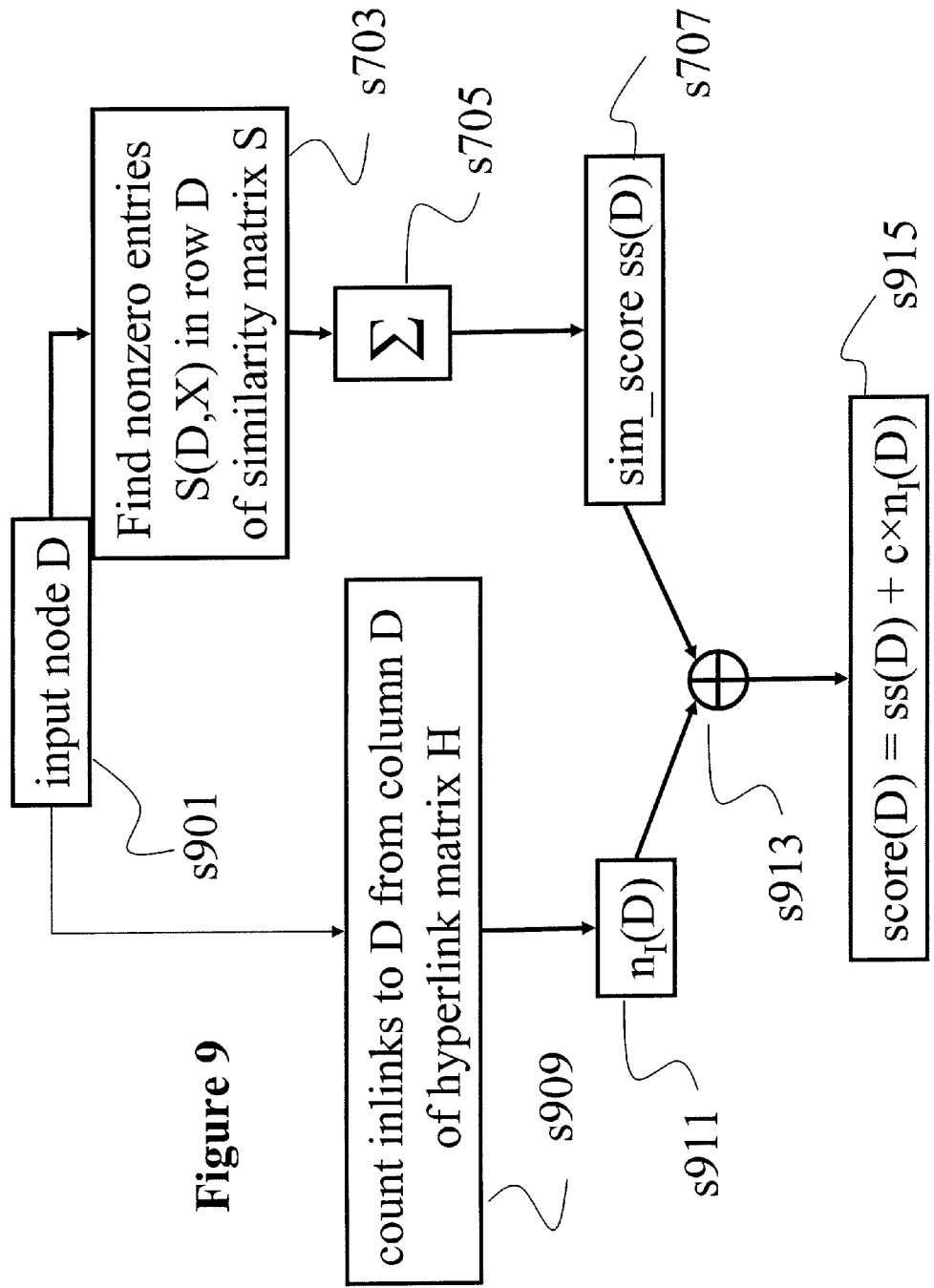
FIG. 9 shows a flow chart corresponding to another embodiment of the invention, in which the whole graph is used for scoring documents, and both similarity links and hyperlinks are used.

FIG. 5 shows a node D, all of D's neighbors (nodes E-I and K) having nonzero similarity links to D, and all nodes pointing to D with hyperlinks. FIG. 9 shows the procedure used to obtain the importance score for a node D in the case that a whole graph is used, and hyperlinks are also present and used in the scoring.

In FIG. 9, the process starts with inputting a node D (S901). Nonzero entries S(D,X) in row D of a corresponding similarity matrix S are then found (S703). The nonzero entries are summed (S705), and a similarity score is output (S707). Also, inlinks to node D are counted from column D of a corresponding hyperlink matrix H (S909), with a total number of counted inlinks output (S911). The similarity score is added to the total number of counted inlinks output (S913), and is output as a total score (S915). The number of counted inlinks output may be scaled with a scale factor C, where 0<C<1. When C=0, the results of the process shown in FIG. 9 are identical to those of the process shown in FIG. 7.

Now suppose that it is desirable to use only a subgraph S' of the documents for defining the context for evaluation. The subgraph variant is the same as for the whole graph, except only nodes in the subgraph (and links from these nodes) are included:

$$n_I^{(S')}(D) = \sum_{\substack{E \in S' \\ E \to D}} \quad (5)$$

and $$r(D) = \sum_{\substack{E \in S \\ E \neq D}} s(D, E) + c \cdot n_I^{(S')}(D). \quad (6)$$

Figure 6:
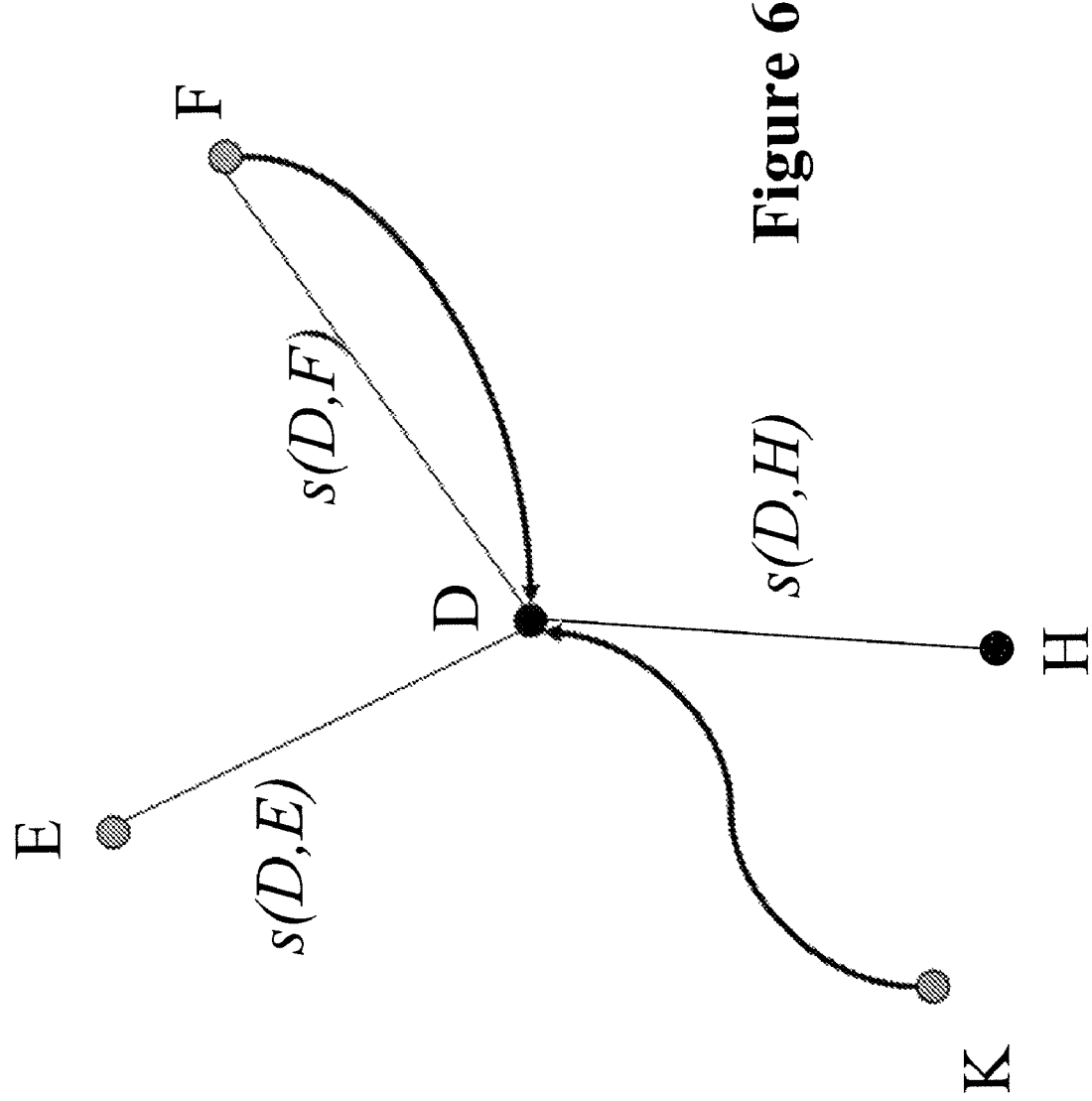
FIG. 6 shows a node D and its neighbors in a subgraph of the similarity graph, with the link strengths, where hyperlinks are also present, and only the neighbors E, F, H, and K lie in the subgraph.
Figure 10:
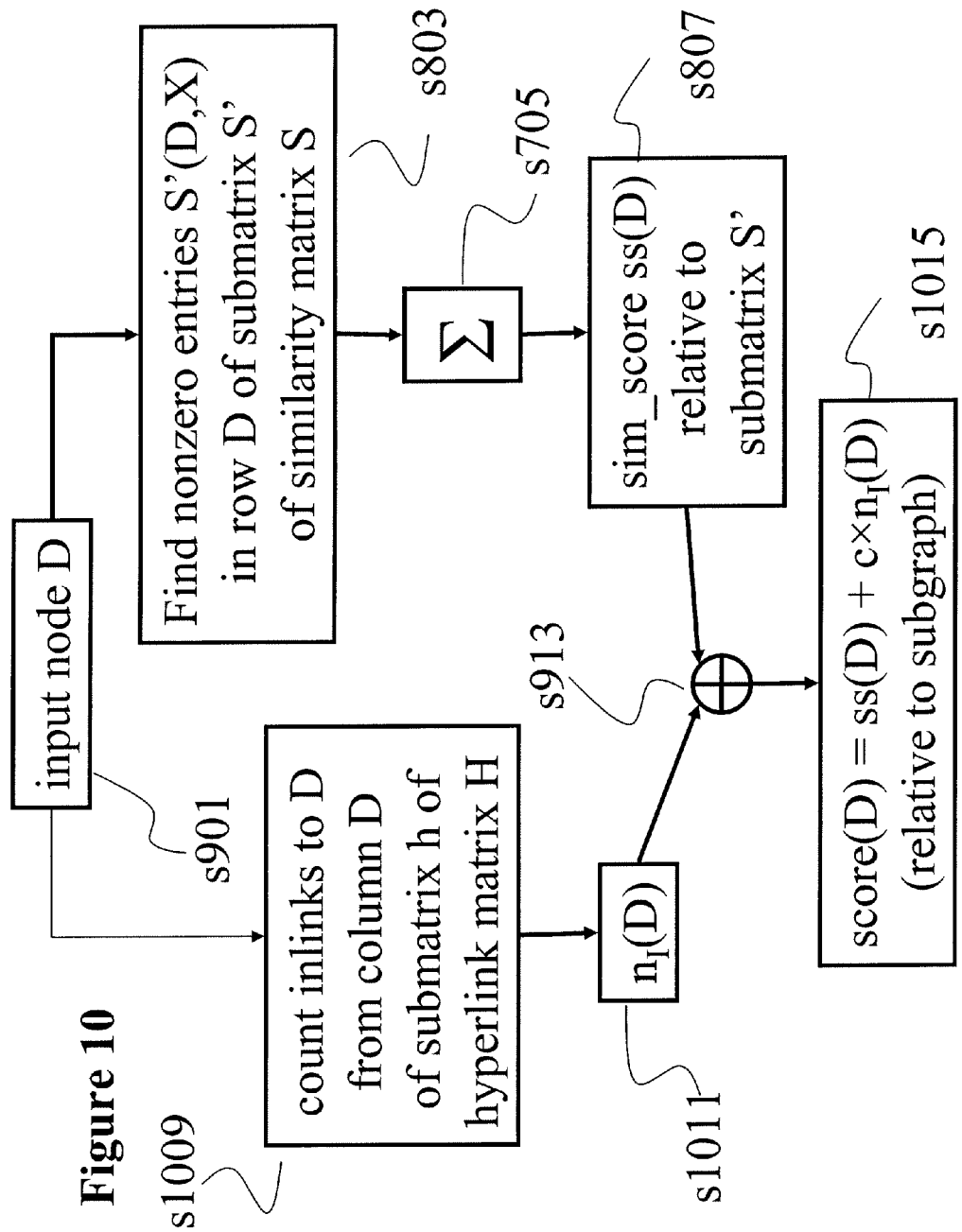
FIG. 10 shows a flow chart corresponding to another embodiment of the invention, in which a subgraph is used for scoring documents, and both similarity links and hyperlinks are used.

FIG. 6 shows the neighborhood of D when only a subgraph is used, hyperlinks are present, and nodes E, F, H, and K (along with D) lie in the subgraph. FIG. 10 shows the procedure used to obtain the importance score for a node D in the case that a subgraph is used, and hyperlinks are also present and used in the scoring.

In FIG. 10, the process starts with inputting a node D (S901). Nonzero entries S' (D,X) in row D of a submatrix S' of a corresponding similarity matrix S are then found (S803). The nonzero entries are summed (S705), and a score relative to the submatrix S' is output (S807). Also, inlinks to node D are counted from column D of a submatrix h of a corresponding hyperlink matrix H (S1009), with a total number of counted inlinks output (S1011). The similarity score is added to the total number of counted inlinks output (S913), and is output as a total score (S1015). The number of counted inlinks output may be scaled with a scale factor C, where 0<C<1. When C=0, the results of the process shown in FIG. 10 are identical to those of the process shown in FIG. 8.

Two hybrids (not shown) of the processes shown in FIGS. 9 and 10 are also possible. That is, it is possible to calculate a final score that is the sum of a score relative to the submatrix S' (S807) and a scaled hyperlink score from the whole graph (S911). Similarly, it is possible to calculate a final score that is the sum of a whole-graph similarity score (S707) and a scaled hyperlink score from a submatrix h (S1011).

Eqns. (1)-(6) give a precise definition of a node's relevance or importance score for the following cases:
Whole graph, with similarity links and no hyperlinks [Eq (1); FIG. 7]
Subgraph, with similarity links and no hyperlinks [Eq (2); FIG. 8]
Whole graph, with similarity links and hyperlinks [Eqs (3) and (4); FIG. 9]
Subgraph, with similarity links and hyperlinks [Eqs (5) and (6); FIG. 10]

These relevance scores can then be used to rank hits from a search, and to display the hits to the user in the form of best hits first.

As noted above, using the entire graph (i.e., the entire document set) to define the context which is used to evaluate each document tends to give highest importance to rather 'generic' documents—i.e., to documents which are central in a sense which is topic-independent. In contrast, if (as is suggested in application Ser. No. 11/227,495 and application Ser. No. 11/349,235) the subgraph is defined by the hit list, then the context for importance evaluation is a topic-focused subgraph. Here, documents which get high scores using the subgraph method are expected to be most central with respect to the topic of the search—but not necessarily with respect to the entire document set.

Thus, using the whole-graph method may then be best when the search is less focused—for example, if a user wants a very general guide as a starting point for finding out more about the search topic that is input. In contrast, the subgraph method is more appropriate when the user has a more focused interest in information, and does not wish to see generically central documents.

With the foregoing description of the present method, it is possible to explain why the link popularity score for a weighted symmetric similarity graph is strongly correlated with the eigenvector centrality score for the same graph. Specifically, one may argue that two cases are unlikely for such a graph:
Case I: that a node has high eigenvector centrality (EVC) but low link popularity score (LPS)
Case II: that a node has high link popularity score (LPS) but low eigenvector centrality (EVC)

If both of these cases are unlikely, then in follows that high LPS implies high EVC, and low LPS implies low EVC. Thus, LPS can be a very good (and efficiently calculated) approximation to EVC.

First, recall the difference between EVC and LPS. A node on a graph has high LPS if the node is "well connected"—as measured by the number and strengths of its links. A node has high EVC if the node is "well connected to nodes that are well connected." Putting this EVC definition into precise form gives an equation whose solution is the principal eigenvector of the link strength matrix (i.e., in this case, the similarity matrix S).

Regarding Case I (high EVC, but low LPS), FIG. 1 shows a node D which has a very high EVC but a low LPS, in a general, unweighted, symmetric graph. That is, if the links are unweighted—or equivalently, if all links get weight 1—then the LPS for node D is its node degree, i.e., 3. The three blobs to which the node is connected are very well connected sub-graphs. Thus node D can have high EVC, because, even though the node has only three neighbors (N1, N2, and N3), all of these neighbors are extremely well connected to other nodes which are well connected.

Now one may assume that the links are weighted between 0 and 1, as they are for the similarity graph S. Since this is Case I, one may still assume that node D has high EVC. This means that the three links from node D must have fairly high weight—much closer to 1 than to 0.

Next consider node D's neighbors. Suppose these neighbors are E, F, and G. The fact that D has strong links to E, F, and G means that D is similar to each of these nodes (which are documents). Similarly, since E, F, and G are all well connected to other nodes, they must be strongly similar to other nodes. For example, suppose F is strongly connected to ten other nodes in its subgraph, named F1, F2, . . . F10.

This reasoning indicates that D is very similar to F, and F is very similar to F1, F2, . . . F10, while at the same time D is not very similar to any of F1, F2, . . . F10. However, this is a contradiction, because there are strong correlations between similarities. That is, if F is very similar to F1, and F is very similar to D, then D and F1 have also a high similarity.

In fact, one can prove that, if $$s(F,D)=(1-\epsilon)$$

and $$s(F,F1)=(1-\epsilon)$$

(where $\epsilon$ is a small number), then the smallest value for s(F1,D) is approximately $$s(F1,D) \geq (1-4\epsilon).$$

Another way to say this is that, for any three nodes A, B, and C, there is a triangle of similarity links (with possibly zero weight) among these three nodes. The point is then that, when the links represent similarity, triangles do not exist with two very strong links and one very weak link. This is simply a mathematical way of saying that, given three documents A, B, and C, if any one of them (say, A) is strongly similar to the other two, then the other two are also fairly strongly similar to one another. In short: no triangle in a similarity graph has two strong links and one weak link.

Now we hold on to our assumption that D has high EVC in FIG. 1. But then D's strong links to E, F, and G, plus their strong links to their neighbors (which gives D its high EVC), means that D has also "fairly strong" links to every neighbor of E, and of F, and of G. Thus, we find that D has in fact many strong links (not just three)—so that D has, in fact, a high link popularity score or LPS.

FIG. 1 is a typical example of Case I for graphs which are not based on similarity. We see that, when we impose the constraints arising from similarity (namely, that there are no "two-legged triangles"), and hold on to the assumption that node D has high EVC, then we find that node D also has high LPS. Thus, a high EVC necessarily implies high LPS:

(high EVC) ⇒ (high LPS). (7)

Figure 2:
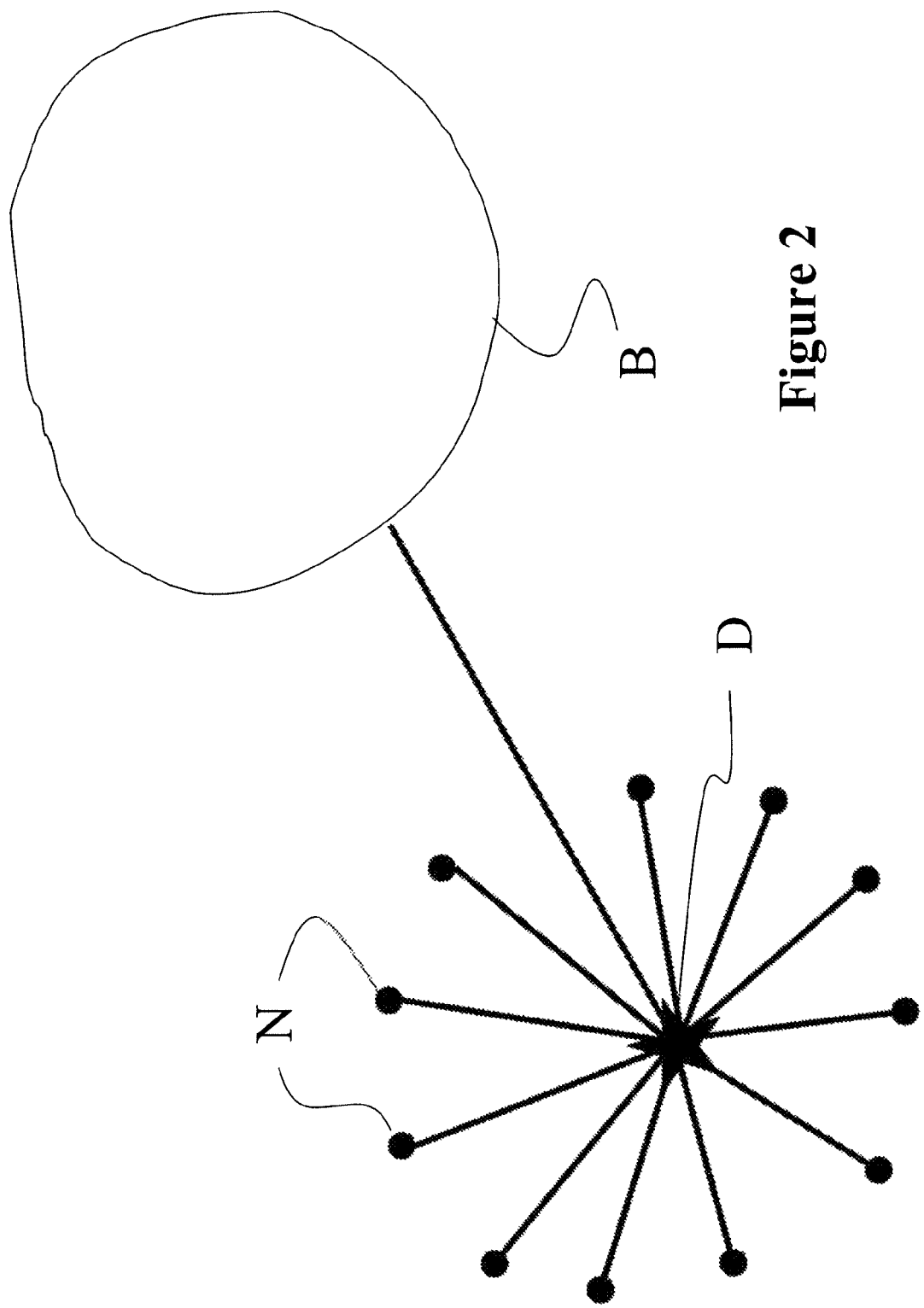
FIG. 2 shows an illustrative graph in which the starred node may have low eigenvector centrality (EVC), but a high link popularity score (LPS)

FIG. 2 shows a generic example of Case II: high LPS but low EVC. The reasoning is similar to that for Case I. That is: first look at a schematic graph that is typical of Case II; impose the constraints (in particular, the rule of "no two-legged triangles") coming from the fact that the graph is a similarity graph; hold onto the condition that the considered node D has a high LPS; and then find, because of the similarity constraints, that node D must also have a high EVC.

The starred node (again called D) has many neighbors and so has high LPS. However, node D and its neighbors (N) are peripheral (i.e., relatively unrelated) to the rest of the graph (represented by the blob B). In particular, none of D's neighbors are well connected; so D has a very low EVC.

This result is consistent if the graph is unweighted and there are no constraints on the links. However, suppose the links are weighted, with weights ranging from 0 to 1 (as they are for a similarity graph). Then node D is in danger of losing its high LPS, relative to nodes in the blob, unless some or all of D's links are strong. That is: for weighted links, even a node with 100 neighbors can have low LPS, relative to a node with just a few neighbors, if the few links to the latter node are strong, while the 100 links of the former node are very weak. Therefore, in order to retain the condition that D has a high LPS, one can give at least some of its many links a high weight.

This will immediately run afoul of the triangle rule for similarity graphs—because, according to FIG. 2 (along with the previously listed assumptions), node D has strong links to several of its neighbors, but none of these neighbors has a strong link to any other neighbor. This results in a large number of two-legged triangles in the picture. If we assume the links are similarity links, then these two-legged triangles are impossible. Still holding on to the assumption that D has high LPS, one is then forced to add a third 'fairly strong' link to each of these triangles—that is, between each pair of D's neighbors for which both nodes of the pair are very similar to D. The result is that D ends up in a neighborhood that is itself very well connected. This neighborhood has many nodes (in FIG. 2, D plus its 10 neighbors); and node D lies very centrally in this well connected neighborhood. Therefore, we find that D has high EVC.

In short: from considering Case II, and then imposing the constraints coming from similarity, we get that (high LPS) ⇒ (high EVC). (8)

Thus, considering the cases I and II, where in each case one score (EVC or LPS) is high while the other (LPS or EVC) is low, it can be seen that neither case is likely when the graph is a similarity graph. This result is summarized in to two implications, corresponding to the relationships numbered (7) and (8) above. Together the relationships numbered (7) and (8) imply that, for a similarity graph, a node's LPS is roughly equivalent, for ranking purposes, to the node's EVC.

Furthermore, as discussed below, tests of ranking via LPS scores show that the results are at least as good as those from ranking via EVC scores.

The above described method has been tested on a small dataset: the Norwegian Wikipedia, with around 20,000 pages. On this dataset, the new method gave, as expected, a reduction in processing time needed. That is, the full-graph EVC method used about 10 iterations of matrix multiplication, while the new method uses only one iteration. The time savings was less than a factor 10 due to other (overhead) contributions to the processing time; however, for larger graphs, the number of iterations will become dominant, and so the time saving is expected to be larger. Also, the new method did not suffer any decrease in performance (compared to the full-graph method) on the tests with the Norwegian Wikipedia. Thus, the tests show that the new method saves processing time, and may not have any significant performance penalty as compared to full-graph methods.

In Tables I and II below are some test results for the present invention. These tests were carried out in February 2006, using a demonstrator. The tests involved giving a set of search words to the demonstrator—which searches the Norwegian Wikipedia—and then, for each search term, scoring the resulting hit list according to the quality of the results. For evaluating the quality of the results, the search results obtained for each tested method were compared to a ranked hit list obtained from the commercial search engine GOOGLE. The top-ranked 10 hits were used for comparison. The score s for the top 10 results for a given search term, obtained using one of the tested methods, was determined using a complex formula which was designed to have the following properties: (i) s=0 when the top 10 results for the tested method exactly match GOOGLE's top 10 results (same results, and same ranking); (ii) deviations from GOOGLE's top 10 increased s, with larger deviations in ranking giving a larger score s; and (iii) random ranking gave an expected score of s=1. Thus, s=0 is a "perfect" score (taking GOOGLE's results as the standard), while any method giving s=1 is not doing any better than a random ranking. Of course, achieving s=0 in such a test is almost impossible, since GOOGLE uses many criteria besides PAGERANK in evaluating hits, while the tested methods used only link information.

First we discuss Table I, which presents results obtained using only similarity links, and only the subgraph S' obtained from a hit list. The eigenvector-based results from the method of application Ser. No. 11/349,235 are compared with those obtained using the present invention [Eq (2), and FIG. 8]. We see that the average score for the method of present invention is somewhat lower than that for the eigenvector-based method of application Ser. No. 11/349,235. Since lower scores are better, we thus find that using LPS rather than EVC does not give (in these tests) any loss in result quality—but rather a slight improvement.

TABLE I

| Search term | SCORES: Subgraph S' eigenvector | Time used | # iterations | SCORES: Present invention Eq (2) | Time used |
|---|---|---|---|---|---|
| Oslo | 0.426029257 | 5.4 | 9 | 0.444126074 | 1.64 |
| Matematikk | 0.689158249 | 0.303 | 20 | 0.463299663 | 0.219 |
| Krig | 0.338203083 | 2.48 | 7 | 0.31102605 | 1.06 |
| Norge Oslo | 0.371420248 | 1.92 | 8 | 0.502927895 | 1.04 |
| Trondheim | 0.749573048 | 1.28 | 17 | 0.746933706 | 1.08 |
| George Bush | 1.154356846 | 0.09 | 20 | 1.11120332 | 0.04 |
| Internett | 0.716242661 | 0.39 | 7 | 0.520547945 | 0.289 |
| Windows | 1.229875519 | 0.148 | 10 | 1.057261411 | 0.06 |
| Astronomi | 1.218045113 | 0.12 | 13 | 1.067669173 | 0.06 |
| Fiske | 1.018181818 | 0.219 | 13 | 1.103030303 | 0.136 |
| Jakt | 1.216161616 | 0.24 | 8 | 1.117171717 | 0.12 |
| Mat | 1.12195122 | 0.45 | 8 | 1.063182346 | 0.297 |
| Økonomi | 0.65083772 | 1.32 | 11 | 0.407716611 | 0.919 |
| Penger | 0.936874052 | 0.5 | 6 | 0.946788063 | 0.3 |
| Hus | 0.904029082 | 1.29 | 6 | 0.786791881 | 1.025 |
| Rike | 0.592881176 | 1.9 | 8 | 0.510005313 | 1.02 |
| Vann | 0.784824976 | 2.54 | 9 | 0.540094607 | 1.13 |
| Bok | 1.220111732 | 0.88 | 9 | 1.167821229 | 0.7 |
| Dyr | 0.844134727 | 0.725 | 8 | 0.833449477 | 0.469 |
| Militaar | 0.623376623 | 0.65 | 6 | 0.623376623 | 0.469 |
| Forsvar | 1.313432836 | 0.19 | 7 | 1.229850746 | 0.1 |
| Forsvaret | 1.033268102 | 0.52 | 7 | 0.966731898 | 0.37 |
| Metode | 1.444776119 | 0.145 | 7 | 1.349253731 | 0.076 |
| SUM | 20.41199187 | 23.7 | 224 | 18.87025978 | 12.619 |
| AVG | 0.887477908 | 1.030435 | 9.73913043 | 0.820446078 | 0.54865217 |

At the same time, we see that the time used by the method of the present invention is about a factor of two smaller than the time used by the eigenvector-based method. The latter method requires on average about 10 iterations. The reduction in time used is less than 10 due to the large proportion of overhead in this demonstrator.

eigenvector-based method uses. (Again, the reduction will be greater for larger graphs, and for more efficiently constructed systems with lower overhead.)

We also see, from comparing Tables I and II, that methods which include hyperlink information gave consistently better results than methods which do not. In summary, we see that

TABLE II

| Search term | SCORES: Subgraph S' + hyperlinks | Time used | # iterations | SCORES: present invention; Eqs Eqs (5) + (6); c = 1 | Time used | SCORES: present invention; Eqs Eqs (5) + (6); c = 0.5 | Time used |
|---|---|---|---|---|---|---|---|
| Oslo | 0.73819937 | 13.9 | 10 | 0.597949027 | 3.9 | 0.597949027 | 3.89 |
| Matematikk | 0.5559596 | 0.49 | 20 | 0.503838384 | 0.58 | 0.480673401 | 0.58 |
| Krig | 0.27780968 | 5.2 | 7 | 0.324614567 | 2.99 | 0.27328017 | 2.99 |
| Norge Oslo | 0.49937363 | 4.15 | 9 | 0.355426074 | 2.9 | 0.351871814 | 2.93 |
| Trondheim | 0.60176991 | 2.26 | 20 | 0.907933551 | 1.87 | 0.852507375 | 1.88 |
| George Bush | 1.07883817 | 0.14 | 7 | 1.068049793 | 0.4 | 1.089626556 | 0.4 |
| Internett | 0.5518591 | 0.715 | 17 | 0.340506806 | 0.84 | 0.575342466 | 0.83 |
| Windows | 1.05726141 | 0.26 | 16 | 0.938589212 | 0.36 | 0.863070539 | 0.355 |
| Astronomi | 1.15789474 | 0.18 | 20 | 1.187969925 | 0.36 | 1.127819549 | 0.374 |
| Fiske | 1.15859596 | 0.36 | 17 | 1.131313131 | 0.5 | 1.131313131 | 0.515 |
| Jakt | 1.3010101 | 0.42 | 8 | 1.060606061 | 0.49 | 1.088888889 | 0.49 |
| Mat | 0.99372822 | 0.81 | 8 | 1.073867596 | 0.8 | 1.063182346 | 0.8 |
| Økonomi | 0.55523217 | 2.63 | 20 | 0.588013404 | 3.62 | 0.475327908 | 3.6 |
| Penger | 0.94678806 | 0.9 | 7 | 0.88234699 | 0.76 | 0.917046029 | 0.76 |
| Hus | 1.07337171 | 2.4 | 10 | 0.930081793 | 2.2 | 0.812844593 | 2.22 |
| Rike | 2.57216221 | 3.9 | 9 | 0.498848946 | 2.5 | 0.40800425 | 2.485 |
| Vann | 0.50727636 | 5.6 | 9 | 0.600105119 | 4.14 | 0.579476506 | 4.13 |
| Bok | 0.81921788 | 1.62 | 20 | 0.630391061 | 1.35 | 0.877318436 | 1.34 |
| Dyr | 0.87619048 | 1.36 | 8 | 0.865505226 | 0.9 | 0.854819977 | 0.89 |
| Militaer | 0.64935065 | 1.16 | 7 | 0.627705628 | 1.04 | 0.61038961 | 1.05 |
| Forsvar | 1.34925373 | 0.32 | 8 | 1.241791045 | 0.64 | 1.265671642 | 0.66 |
| Forsvaret | 0.97455969 | 0.97 | 20 | 0.747553816 | 1.03 | 0.888454012 | 1.04 |
| Metode | 1.48059701 | 0.24 | 20 | 1.373134328 | 0.39 | 1.373134328 | 0.38 |
| SUM | 19.7772998 | 49.985 | 297 | 18.47614348 | 34.56 | 18.55801255 | 34.589 |
| AVG | 0.8598826 | 2.17326087 | 12.9130435 | 0.803310586 | 1.502609 | 0.806870111 | 1.50387 |

Table II presents results for the case that both a similarity subgraph S' and the corresponding hyperlinks of the Wikipedia graph are used in link analysis. In other words, for the searches in this Table, a hybrid subgraph is used as the starting point. The method of application Ser. No. 11/227,495 uses the principal eigenvector of the hybrid matrix for scoring and ranking hits (first column of Table II). Results for the method of the present invention, as applied to a hybrid graph [Eqs (5) and (6), and FIG. 10], are shown for c=1 and for c=0.5. We see again that there is a slight improvement in scores for the method of the present invention, as compared to the eigenvector-based method of application Ser. No. 11/227,495. At the same time we see that the LPS-based method of the present invention uses only about 70% of the time that the the method of the present invention can give a significant improvement for both the hybrid case (where both hyperlinks and similarity links are used) and the case where only similarity links are used.

Based on these and other test results, the subgraph methods of Application Ser. No. 11/227,495 and application Ser. No. 11/349,235 are expected to give the best results in most, but not all cases. Hence, the subgraph methods of application Ser. No. 11/227,495 and application Ser. No. 11/349,235 will likely be the method of choice for many applications of the technology. However, these subgraph methods can be prone to a bottleneck problem that is represented by the unavoidably online nature of the importance score calculation.

The present invention offers a useful way to greatly decrease the time requirement of either subgraph or whole-graph methods of either application Ser. No. 11/227,495 or application Ser. No. 11/349,235, thus resulting in an option that can, in the correct circumstance, be quicker and more practical.

Furthermore, tests suggest that the present invention provides a time speedup with no loss in quality of the results. Hence the present invention improves upon methods involving use of the similarity matrix—such as the methods of application Ser. No. 11/227,495 or application Ser. No. 11/349,235—and also, when applicable, hybrid methods also described in application Ser. No. 11/227,495 or application Ser. No. 11/349,235.

The present invention is implemented on a computer-based device and with a computer-based product. The computer-based device may be a plurality of devices connected over a network. A discussion on how computers and network work is presented in "How Computers Work," Millennium Edition, Ron White, McMillan Computer Publishing, 1999, the entire contents of which is incorporated by reference.

The invention claimed is:

1. A link analysis method, implemented using a computer based link analysis apparatus, for determining a context-based relevance of a first electronic document of a plurality of electronic documents to remaining electronic documents of said plurality of electronic documents, comprising:

populating, using the link analysis apparatus, a weighted symmetric similarity matrix S with link weights representing a measure of similarity between pairs of said plurality of electronic documents;

determining, using the link analysis apparatus, entries S(D, X) in a row of said similarity matrix S corresponding to an electronic document D;

summing, using the link analysis apparatus, said entries of at least a submatrix S' of similarity matrix S to produce a first importance score regarding said electronic document D; and one of searching, navigating and ranking, using the link analysis apparatus, at least a subset of said plurality of electronic documents based on a total score including said first importance score.

2. The method of claim 1, further comprising:
populating a hyperlink matrix H of all inlinks;
counting inlinks to said document D in at least a submatrix H' of said hyperlink matrix H and outputting a total number of counted inlinks as a second importance score;
multiplying said second importance score by a scaling factor C, where $0<C\leq 1$;
adding said first and second score to form said total score.

3. The method of claim 1, wherein said at least a submatrix S' of similarity matrix S is an entire amount of said similarity matrix S.

4. The method of claim 2, wherein said at least a submatrix S' of similarity matrix S is an entire amount of said similarity matrix S.

5. The method of claim 2, wherein said at least a submatrix H' of hyperlink matrix H is an entire amount of said similarity matrix H.

6. A computer readable storage medium containing stored thereon instructions that when executed by a computing device cause the computing device to execute a link analysis method for determining a context-based relevance of a first electronic document of a plurality of electronic documents to remaining electronic documents of said plurality of electronic documents, the method comprising:

populating a weighted symmetric similarity matrix S with link weights representing a measure of similarity between pairs of said plurality of electronic documents;

determining entries S(D,X) in a row of said similarity matrix S corresponding to an electronic document D;

summing said entries of at least a submatrix S' of similarity matrix S to produce a first importance score regarding said electronic document D; and one of searching, navigating and ranking at least a subset of said plurality of electronic documents based on a total score including said first importance score.

7. The computer readable storage medium of claim 6, further comprising:
populating a hyperlink matrix H of all inlinks;
counting inlinks to said document D in at least a submatrix H' of said hyperlink matrix H and outputting a total number of counted inlinks as a second importance score;
multiplying said second importance score by a scaling factor C, where $0<C\leq 1$;
adding said first and second score to form said total score.

8. The computer readable storage medium of claim 6, wherein said at least a submatrix S' of similarity matrix S is an entire amount of said similarity matrix S.

9. The computer readable storage medium of claim 7, wherein said at least a submatrix S' of similarity matrix S is an entire amount of said similarity matrix S.

10. The computer readable storage medium of claim 7, wherein said at least a submatrix H' of hyperlink matrix H is an entire amount of said similarity matrix H.

11. The method of claim 1, wherein the determining further comprises determining only nonzero entries S(D,X) in a row of said similarity matrix S corresponding to an electronic document D.

12. The computer readable storage medium of claim 6, wherein the determining further comprises determining only nonzero entries S(D,X) in a row of said similarity matrix S corresponding to an electronic document D.

* * * * *